US006664349B2

(12) United States Patent
Wang et al.

(10) Patent No.: US 6,664,349 B2
(45) Date of Patent: Dec. 16, 2003

(54) ETHYLENE POLYMERIZATION PROCESS

(75) Inventors: Shaotian Wang, Mason, OH (US); Jean A. Merrick-Mack, West Chester, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 09/820,404

(22) Filed: Mar. 29, 2001

(65) Prior Publication Data

US 2002/0161144 A1 Oct. 31, 2002

(51) Int. Cl.[7] .................................................. C08F 4/44
(52) U.S. Cl. ...................... 526/134; 526/131; 526/133; 526/126; 526/160; 526/170; 526/904; 526/943; 526/351; 526/352; 526/348.5; 526/348.2
(58) Field of Search ........................... 526/348.5, 348.2, 526/351, 352, 904, 943, 170, 160, 133, 134, 151, 153

(56) References Cited

U.S. PATENT DOCUMENTS

| | | | |
|---|---|---|---|
| 5,539,124 A | 7/1996 | Etherton et al. | 548/402 |
| 5,554,775 A | 9/1996 | Krishnamurti et al. | 556/7 |
| 5,637,659 A | 6/1997 | Krishnamurti et al. | 526/133 |
| 5,637,660 A | 6/1997 | Nagy et al. | 526/160 |
| 5,756,611 A | 5/1998 | Etherton et al. | 526/127 |
| 5,859,157 A | 1/1999 | Gupte et al. | 526/88 |
| 6,034,027 A | 3/2000 | Krishnamurti et al. | 502/200 |
| 6,127,484 A | 10/2000 | Cribbs et al. | 525/191 |
| 6,201,076 B1 * | 3/2001 | Etherton et al. | 526/74 |
| 6,204,216 B1 | 3/2001 | Nagy et al. | 502/103 |
| 6,211,311 B1 * | 4/2001 | Wang et al. | 526/131 |
| 6,291,386 B1 * | 9/2001 | Wang | 502/124 |
| 6,403,736 B1 * | 6/2002 | Wang | 526/160 |
| 2002/0137861 A1 * | 9/2002 | Soong | 526/129 |

FOREIGN PATENT DOCUMENTS

| | | |
|---|---|---|
| WO | WO 93/08211 | 4/1993 |
| WO | WO 94/07928 | 4/1994 |
| WO | WO 01/64757 | 9/2001 |

OTHER PUBLICATIONS

R. N. Shroff and H. Mavridis, "Long–Chain–Branching Index for Essentially Linear Polyethylenes," *Macromolecules* vol. 32, No. 25, pp. 8454–8464 (1999).

* cited by examiner

*Primary Examiner*—David W. Wu
*Assistant Examiner*—Rip A. Lee
(74) *Attorney, Agent, or Firm*—Shao Guo

(57) ABSTRACT

An ethylene polymerization process is disclosed. The process uses a single-site catalyst that contains a boraaryl ligand. It comprises supporting the catalyst, forming a slurry of the supported catalyst in an organic solvent, mixing the catalyst slurry with trialkyl aluminum compound, and polymerizing ethylene in the presence of the trialkyl aluminum-treated catalyst slurry. The process gives polyethylene having a controlled long-chain-branch index.

16 Claims, No Drawings

ETHYLENE POLYMERIZATION PROCESS

FIELD OF THE INVENTION

The invention relates to ethylene polymerization using single-site catalysts. More particularly, the invention relates to a process that produces polyethylene having a controlled long-chain-branch index.

BACKGROUND OF THE INVENTION

Single-site catalysts are known. They can be divided into metallocenes and non-metallocenes. Metallocene single-site catalysts are transition metal compounds that contain cyclopentadienyl (Cp) or Cp derivative ligands. Non-metallocene single-site catalysts contain ligands other than Cp but have similar catalytic characteristics to the metallocenes. The non-metallocene single-site catalysts often contain heteroatomic ligands, e.g., boraary (see U.S. Pat. No. 6,034,027), pyrrolyl (U.S. Pat. No. 5,539,124), azaborolinyl (U.S. Pat. No. 5,756,611) and quinolinyl (U.S. Pat. No. 5,637,660). Single-site catalysts produce polyethylenes having many properties that are not available to those made with Ziegler catalysts, for example, narrow molecular weight distribution and low density.

Successful production of polyethylene with the newly developed single-site catalysts offers many challenges. First, the catalysts often need to be modified for the desired activity and stability. For example, co-pending U.S. application Ser. No. 09/318,009 teaches in-situ alkylation of a transition metal complex that has at least one labile ligand with an alkyl aluminum compound in the polymerization system. The labile ligand is replaced by an alkyl group, resulting in a catalyst having improved stability and activity.

Polyethylene and other olefin polymers made with single-site catalysts are highly desirable if they can be produced in the existing equipment. Successful commercial production often requires the polyethylene have a relatively high bulk density (usually greater than about 0.30 g/cm$^3$). Low bulk density gives a low production rate, causes difficulty in operation, and often results in inferior product quality. Co-pending U.S. application Ser. No. 09/593,878 teaches how to increase bulk density of polyethylene by premixing supported boraaryl single-site catalysts with an alkyl aluminum.

Moreover, single-site catalysts often produce olefin polymers of narrow molecular weight distributions. The uniformity of molecular weight distribution, although improving tensile strength and other physical properties of polymer products, makes the thermal processing more difficult. U.S. Pat. No. 6,127,484, for example, teaches a multiple-zone, multiple-catalyst process for making polyethylene. The polymer produced has a broad molecular weight distribution and improved processability.

It is also known that increasing long-chain branching can improve processability of polyethylene made with single-site catalysts. The existence of long-chain branching in polyethylene is particularly important for blown film extrusion and blow molding process. However, achieving long-chain branching often requires the use of specific catalysts. For example, WO 93/08221 teaches how to increase the concentration of long-chain branches in polyethylene by using constrained-geometry single-site catalysts.

New methods for increasing long-chain branching in polyethylene are needed. Ideally, the method would use a readily available single-site catalyst and would be easy to practice.

SUMMARY OF THE INVENTION

The invention is a process for producing polyethylene that has a controlled long-chain-branch index (LCBI). The process uses a Group 4 metal single-site catalyst that contains at least one boraaryl ligand. The process comprises supporting the catalyst, forming a slurry of the supported catalyst in an organic solvent, mixing the catalyst slurry with a trialkyl aluminum compound, and polymerizing ethylene in the presence of the alkylated catalyst slurry.

DETAILED DESCRIPTION OF THE INVENTION

The invention is a process for producing polyethylene that has a controlled long-chain-branch index (LCBI). LCBI is a rheological index used to characterize low levels of long-chain branching in essentially linear polyethylenes. LCBI is defined as:

$$LCBI = \frac{\eta_0^{0.179}}{4.8 \cdot [\eta]} - 1$$

where $\eta_0$ is the limiting, zero-shear viscosity (Poise) at 190° C. and $[\eta]$ is the intrinsic viscosity in trichlorobenzene at 135° C.(dL/g). LCBI is based on observations that low levels of long-chain branching, in an otherwise linear polymer, result in a large increase in melt viscosity, $\eta_0$, with no change in intrinsic viscosity, $[\eta]$. See R. N. Shroff and H. Mavridis, "Long-Chain-Branching Index for Essentially Linear Polyethylenes," *Macromolecules*, Vol. 32 (25), pp. 8454–8464 (1999). Higher LCBI means a greater number of long-chain branches per polymer chain.

The process of the invention uses a Group 4 metal single-site catalyst. Preferably, the metal is Zirconium. The catalyst contains at least one boraaryl ligand. Suitable boraaryl ligands include substituted or unsubstituted borabenzenes, boranaphthalenes, boraanthracenes, and boraphenanthrenes. Preferably, the boraaryl ligand is borabenzene or a substituted borabenzene, e.g., 1-methylborabenzene. U.S. Pat. Nos. 5,554,775, 5,637,659, and 6,034,027, the teachings of which are herein incorporated by reference, teach how to prepare catalysts that contain a boraaryl ligand.

In addition to a boraaryl ligand, the catalyst contains other ligands. The total number of ligands satisfies the valence of the transition metal. The ligands can be bridged or non-bridged. Examples include substituted or unsubstituted cyclopentadienyls, indenyls, fluorenyls, halides, $C_1$–$C_{10}$ alkyls, $C_6$–$C_{15}$ aryls, $C_7$–$C_{20}$ aralkyls, dialkylamino, siloxy, alkoxy, and the like, and mixtures thereof. Cyclopentadienyls and indenyls are preferred.

Examples of boraaryl based single-site catalysts are (borabenzene)(cyclopentadienyl)zirconium dichloride, (1-methylborabenzene)(cyclopentadienyl)zirconium dichloride, (borabenzene)(indenyl)-zirconium dichloride, (1-methylborabenzene)(indenyl)zirconium dichloride, (boranaphthalene)(cyclopentadienyl)zirconium dichloride, and (boraanthracene)(cyclopentadienyl) zirconium dichloride.

The catalyst is immobilized on a support. The support is preferably a porous material such as inorganic oxides and chlorides, and organic polymer resins. Preferred inorganic oxides include oxides of Group 2, 3, 4, 5, 13, or 14 elements. Preferred supports include silica, alumina, silica-aluminas, magnesias, titanias, zirconias, magnesium chloride, and crosslinked polystyrene. Silica is most preferred.

Preferably, the support has a surface area in the range of about 10 to about 700 m$^2$/g, a pore volume in the range of about 0.1 to about 4.0 mL/g, an average particle size in the range of about 10 to about 500 μm, and an average pore diameter in the range of about 10 to about 1000 Å. They are preferably modified by heat treatment, chemical modification, or both. For heat treatment, the support is preferably heated at a temperature from about 50° C. to about 800° C. More preferably, the temperature is from about 50° C. to about 300° C.

Suitable chemical modifiers include organoaluminum, organosilicon, organomagnesium, and organoboron compounds. Organosilicon and organoboron compounds, such as hexamethyl-disilazane and triethylborane, are preferred. Suitable techniques to support a single-site catalyst are taught, for example, in U.S. Pat. No. 6,211,311, the teachings of which are incorporated herein by reference.

The catalyst is used with an activator. Activators can be combined with the Group 4 metal catalyst and the support or they can be added separately to the polymerization reactor. Suitable activators include anionic compounds of boron and aluminum, trialkylborane and triarylborane compounds, and the like. Examples are lithium tetrakis-(pentafluorophenyl) borate, triphenylcarbenium tetrakis(pentafluoro-phenyl) borate, lithium tetrakis(pentafluorophenyl) borane, the like and mixtures thereof. Activators are generally used in an amount within the range of about 0.01 to about 100,000, preferably from about 0.1 to about 1,000, and most preferably from about 0.5 to about 300, moles per mole of the single-site catalyst.

The supported catalyst is dispersed in an organic solvent to form a slurry. Suitable organic solvents include aliphatic and aromatic hydrocarbons. Examples are heptane, butane, cyclohexane, and toluene. Aliphatic hydrocarbons are preferred. The amount of solvent to be used is not critical. Generally, the solvent is used in an amount to completely soak the catalyst. The catalyst slurry is preferably formed at an ambient temperature.

The catalyst slurry is then mixed with a trialkyl aluminum compound. Examples of suitable alkyl aluminum include trimethyl aluminum (TMA), triethyl aluminum (TEAL) and triisobutyl aluminum (TIBAL). When the catalyst slurry is mixed with alkyl aluminum, the induction time (i.e, the time from adding the catalyst to the time it starts the polymerization) is reduced and the bulk density of polyethylene is increased. See co-pending U.S. patent application Ser. No. 09/593,878 . The molar ratio of trialkyl aluminum to catalyst slurry is preferably within the range of about 1 to about 500, more preferably from about 10 to about 300 and most preferably from about 50 to about 200. The mixing is preferably performed just prior to the polymerization. Aging the premixed catalyst may reduce its effectiveness in reducing the induction time and increase the bulk density.

Polymerization is conducted in the presence of the trialkyl aluminum-treated catalyst slurry. It can be conducted in bulk, gas phase or slurry phase. Methods and apparatus for gas phase polymerization of ethylene with Ziegler catalysts are well known, and they are suitable for use in the process of the invention. For example, U.S. Pat. No. 5,859,157, the teachings of which are herein incorporated by reference, teaches in detail a gas phase polymerization of ethylene with a Ziegler catalyst. The slurry-phase polymerization is performed in an organic solvent that can disperse the catalyst and polyethylene. Suitable solvents include $C_4$ to $C_{10}$ linear, branched, and cyclic aliphatic, and $C_6$–$C_{12}$ aromatic hydrocarbons. Examples of suitable solvents are butane, hexane, cyclohexane, octane, and isobutane.

The polymerization is preferably conducted under pressure. The pressure is preferably in the range of about 150 to about 15,000 psi, more preferably from about 200 to about 5,000 psi, and most preferably from about 200 to about 2,000 psi. Generally, the higher the pressure, the more productive the process. Laboratory operations are conducted under relatively low pressure for safety reasons. Polymerization is preferably conducted at a temperature below 90° C. More preferably, the temperature is within the range of about 50° C. to about 85° C. We have surprisingly found that when the polymerization is conducted at 90° C., the LCBI drops dramatically (see Example 4).

The polymerization is preferably performed in the absence of hydrogen. When hydrogen is used, the LCBI of polyethylene is reduced (see Example 3).

A scavenger is preferably used in the polymerization. Scavengers reduce the effect of a trace amount of moisture and oxygen existing in the reactor on the polymerization and increase the activity and lifetime of the catalysts. Suitable scavengers include alkyl aluminum compounds. Scavengers are added into the reactor prior to the addition of the trialkyl aluminum-treated catalyst slurry. The amount of scavengers is about 1 to 500 times of the amount of the trialkyl aluminum-treated catalyst slurry.

The invention also includes the ethylene polymers made by the process, including polyethylene and copolymers of ethylene with a $C_3$–$C_{10}$ α-olefin. Suitable α-olefins include propylene, 1-butene, 1-hexene, and 1-octene, and the like, and mixture thereof. The molar ratio of ethylene/α-olefin is within the range of 50/50 to 100/0. The ethylene polymers of the invention have an LCBI greater than about 0.67. The polymers are widely used in the industry for making films, molded parts, and other products.

The following examples merely illustrate the invention. Those skilled in the art will recognize many variations that are within the spirit of the invention and scope of the claims.

EXAMPLE 1

Preparation of Polyethylene

Modification of Silica Support

Hexamethyldisilazane (12.5 parts) is slowly added to Davison 948 silica (100 parts, product of Davison Chemical Company) with stirring for two hours at 25° C. The treated silica is dried at 150° C. for 6 hours in a fluidized bed dryer with nitrogen flow, and then dispersed in heptane (3.5 mL heptane/g silica) to form a slurry. Triethylborane (24.5 parts, product of Aldrich, 95+%) is slowly added to the slurry with stirring. The slurry is heated and refluxed at 100° C. for 6 hours and then cooled to 25° C. The modified support is isolated by removing the solvent and it is then dried under vacuum.

Preparation of Catalyst

Cyclopentadienyl(1-methylborabenzene)zirconium dichloride (68.6 parts) and trityl tetrakis(pentafluorophenyl) borate (278.5 parts) are dissolved in toluene (3772 parts). The solution is added to the modified support (2159 parts) with stirring at 30° C. for 7 hours. The supported catalyst is dried under vacuum at 25° C. for 7.5 hours.

Preparation of Catalyst Slurry

The supported catalyst (200 mg) is added into heptane (10 mL) with stirring at 25° C. to form a slurry. The slurry is stored at 25° C.

Polymerization

Fatty amine (4 mg, Armostat® 710, product of Akzo Nobel) and isobutane (about 350 mL) are charged into a 1L stainless-steel autoclave. Ethylene is added to the reactor to 450 psig total pressure. The reactor contents are heated to 85° C. The catalyst slurry (22.5 mg) is premixed with TIBAL (0.4 mL, 1.0 M in heptane) in an injector at 25° C. for 10 minutes and then injected into the reactor with about 50 mL of isobutane. The reaction is carried out at 85° C. for 30 minutes. The polymer is collected after the solvent is vented from the reactor; it is then dried in a vacuum oven to a constant weight. The polymer has LCBI: 0.90, $MI_2$: 0.3 dg/min, and $MI_{20}$: 59 dg/min.

COMPARATIVE EXAMPLE 2

The procedure of Example 1 is repeated but the supported catalyst is directly used without forming a slurry in an organic solvent. The polyethylene has LCBI: 0.67, $MI_2$: 0.37 dg/min, and $MI_{20}$: 54 dg/min.

COMPARATIVE EXAMPLE 3

The procedure of Example 1 is repeated but hydrogen is added to the reactor prior to polymerization to bring the reactor pressure from 450 psig to 459 psig. The polyethylene has LCBI: 0.44, $MI_2$: 0.98 dg/min, and $MI_{20}$: 47 dg/min.

COMPARATIVE EXAMPLE 4

The procedure of Example 1 is repeated but the polymerization is conducted at 90° C. rather than 85° C. The polyethylene has LCBI: 0.33, $MI_2$: 1.7 dg/min, and $MI_{20}$: 41 dg/min.

We claim:

1. A process which comprises:
   (a) combining a Group 4 metal catalyst that contains at least one boraaryl ligand with a support selected from the group consisting of inorganic oxides, inorganic chlorides, and organic polymer resins;
   (b) forming a slurry of the supported catalyst in an organic solvent;
   (c) mixing the catalyst slurry with a trialkyl aluminum compound prior to adding the catalyst slurry to a polymerization reactor; and
   (d) polymerizing an olefin that comprises:
      i) from 50 to 100 mole % of ethylene; and
      ii) from 0 to 50 mole % of a $C_3$–$C_{10}$ α-olefin in the presence of the product of step (c) and an activator, and in the absence of hydrogen, wherein the polymer has a long-chain-branch index (LCBI) greater than about 0.67.

2. The process of claim 1 wherein the polymerization is conducted at a temperature less than 90° C.

3. The process of claim 1 wherein the polymerization is conducted at a temperature within the range of about 50° C. to about 85° C.

4. The process of claim 1 wherein the $C_3$–$C_{10}$ α-olefin is selected from the group consisting of propylene, 1-butene, 1-pentene, 1-hexene, 1-octene, and mixtures thereof.

5. The process of claim 1 wherein the $C_3$–$C_{10}$ α-olefin is 1-hexene.

6. The process of claim 1 wherein the Group 4 metal is titanium.

7. The process of claim 1 wherein the Group 4 metal is zirconium.

8. The process of claim 1 wherein the Group 4 metal is hafnium.

9. The process of claim 1 wherein the boraaryl ligand is selected from the group consisting of borabenzenes, boranaphthalenes, boraanthracenes, and boraphenathrenes.

10. The process of claim 1 wherein the boraaryl ligand is 1-methyl borabenzene.

11. The process of claim 1 wherein the catalyst further comprises a ligand selected from the group consisting of cyclopentadienyls, indenyls, fluorenyls, halides, alkyls, aryls, aralkyls, dialkylaminos, siloxys, and alkoxys.

12. The process of claim 1 wherein two ligands of the catalyst are bridged.

13. The process of claim 1 wherein the Group 4 metal catalyst is cyclopentadienyl(1-methylborabenzene) zirconium dichloride.

14. The process of claim 1 wherein the activator is selected from the group consisting of anionic compounds of boron or aluminum, trialkylboron compounds, and triarylboron compounds.

15. The process of claim 1 wherein the activator is trityl tetrakis(pentafluorophenyl)borate.

16. The process of claim 1 wherein the organic solvent is an aliphatic hydrocarbon.

* * * * *